United States Patent [19]

Windisch et al.

[11] 4,117,387

[45] Sep. 26, 1978

[54] CASCADING-WATER, LEAD-ACID STORAGE BATTERY NEUTRALIZATION FORMING AND CHARGING METHOD

[75] Inventors: Lawrence Windisch, Selma, Ala.; John Nees; Harry M. Channing, both of Wyomissing, Pa.

[73] Assignee: General Battery Corporation, Reading, Pa.

[21] Appl. No.: 821,527

[22] Filed: Aug. 3, 1977

[51] Int. Cl.² .................. H02J 7/00; H01M 10/50
[52] U.S. Cl. ................................ 320/2; 320/35; 204/2.1; 429/120
[58] Field of Search ............... 320/2, 15, 22, 30, 35, 320/37, 39, 43, 57; 204/2.1, 194; 429/62, 120, 90, 92, 93

[56] References Cited

U.S. PATENT DOCUMENTS

| 649,491 | 5/1900 | Sperry | 429/120 |
|---|---|---|---|
| 1,157,028 | 10/1915 | Noble | 320/37 X |
| 2,528,266 | 10/1950 | Daily et al. | 320/15 X |
| 4,007,315 | 2/1977 | Brinkman et al. | 429/120 |

Primary Examiner—Robert J. Hickey
Attorney, Agent, or Firm—Benasutti Associates, Ltd.

[57] ABSTRACT

A method for producing batteries having plastic cases wherein a plurality of sets of batteries are placed in a plurality of portable tanks or tubs which are positioned at different heights above the floor and filled with water, filling the highest tub first and allowing it to overflow to fill the adjacent lower tub and so on until all tubs are filled and overflowing. Before the water is added to the tanks, electrolyte is added to unfilled, unformed batteries and a separate rectifier circuit is connected to each set of batteries for passing current therethrough to form or charge the batteries.

12 Claims, 5 Drawing Figures

4,117,387

CASCADING-WATER, LEAD-ACID STORAGE BATTERY NEUTRALIZATION FORMING AND CHARGING METHOD

BACKGROUND OF THE INVENTION

This invention relates to the production of batteries having plastic cases during the neutralization, forming and charging stages.

DESCRIPTION OF THE PRIOR ART

One of the classical problems in the battery industry is controlling temperature and time of battery formation. When electrolyte is first added to an unfilled, unformed battery and interacts with the paste on the plates of the element assembly within the battery, a great deal of heat is generated; this heat being referred to as heat of neutralization. Heat continues to be generated by the battery during the formation and charging process while high current flow is present through the batteries. It is uneconomical to purchase and maintain sufficient equipment to form batteries at a current low enough to prevent the heating of the batteries.

Various means have been devised to cool batteries during the neutralization, formation, and charging process in order to avoid internal overheating of the batteries which, if not properly controlled, results in destruction of the battery. The problem of dissipating heat which is generated during the formation of a battery has been aggravated by the widespread use of plastic battery cases throughout the automotive battery industry. Unlike rubber, composition, or glass cases previously used by the industry, plastic cases tend to have a low heat transfer coefficient which tends to insulate the interior of the battery making it particularly susceptible to overheating problems.

Several approaches, such as circulating water baths in which batteries stand in low rows of tanks permanently erected on the floor of the forming room have been used in attempts to dissipate the heat produced when using high current during the battery neutralization, formation and charging process. While this has been successful, it is a highly restrictive technique and does not allow individual rectifying circuit control for batteries at various stages of neutralization, formation, and charging. Another method which has been used is the water spray in which the batteries are sprayed with water or cooling fluid. However, this approach is not as good as the circulating bath method since the water spray does not have the heat conducting capacity of the former method. Chilled electrolyte has been used as a method of reducing the heat of neutralization. However, this is an expensive method and while it reduces the high initial peak, the possibility of high heat developing during formation exists as well as the possibility of having a delayed thermal runaway.

Due to the relatively higher volumes of batteries produced, and the plastic case designs, the various grid alloys and oxide mixtures now commonly used in the production of automotive batteries, the prior art techniques above have not proved satisfactory and relatively long formation times have therefore been necessitated to insure that overheating does not occur during formation.

SUMMARY OF THE INVENTION

Applicant's invention basically comprises a battery production method wherein sets of batteries are placed in a plurality of portable tanks or tubs; the batteries within each tub being electrically interconnected within that tub so that a minimum number of leads are required for subsequent connection to a charging circuit. The tubs are then stacked at a plurality of heights above the forming room floor and in the preferred embodiment the tubs are disposed substantially vertically above one another. Each tube of batteries is readily interchangeable with the other tubs in the various vertical positions. Cooling fluid such as water is introduced into the highest tub to a predetermined level above which the water overflows and begins to fill the adjacent lower tub which in turn overflows to fill the remaining tubs until all the tubs have been filled with water and are overflowing. If desired, the overflow cooling fluid or water coming from the last tub at the lowest position can be conveyed to a cooling tower which removes the heat from the cooling fluid and the cooling fluid is then conveyed to the tub in the highest position.

Since each of the tubs of batteries are interchangeable in the various heights above the floor and further since the cascading action of the water described above tends to skim off and pass on only the warmest portions of the coolant from one tube to the next, it is desirable to establish a flow pattern of coolant so that immediately upon its reintroduction into the system from the cooling tower, the coolant is utilized to service batteries which are undergoing the initial phases of the formation process, which phases are responsible for the greatest generation of heat. Accordingly, those batteries nearing the end of the formation process and/or which are being given a boost charge, may be suitably arranged in vertical position to receive the effluent or overflow from "primary" or higher tubs, whereby a given amount of cooling fluid and/or cooling tower capacity cools a maximum number of batteries in a minimum amount of forming room space.

Applicant's invention also includes a process whereby a lower rate of current is used to pass through the batteries immediately following the introduction of electrolyte into unfilled, unformed batteries. This will avoid unnecessary heat generation while the heat of neutralization is being reduced or accomodated. Following the initial stage after a predetermined amount of time, the amount of current is increased until a second predetermined period is finished at which time the current is again lowered during the final charging stage.

An object of the present invention is to provide a new, novel and unobvious method of cooling batteries with plastic cases in the neutralization, forming and charging stages and thereby improving battery production.

Another object of the present invention is to provide a method which allows individual charging circuit control of batteries in various stages in neutralization, formation, and charging.

It is an object of the present invention to provide a method of producing batteries with plastic cases which controls temperature and time of battery neutralization, formation, and charging.

It is another object of the present invention to provide a method of producing batteries with plastic cases which allows the use of high charging current.

It is an object of the present invention to provide a method of producing batteries which produces a maximum number of batteries in a minimum amount of forming room floor space.

It is another object of the present invention to provide a method of cooling batteries during the neutralization, forming, and charging stages of production which allows individual charging circuit controls of batteries in various stages of production.

This and other objects of my invention will become apparent from the following description with reference to the accompanying drawings.

DESCRIPTION OF THE PREFERRED EMBODIMENT

Figure 1:
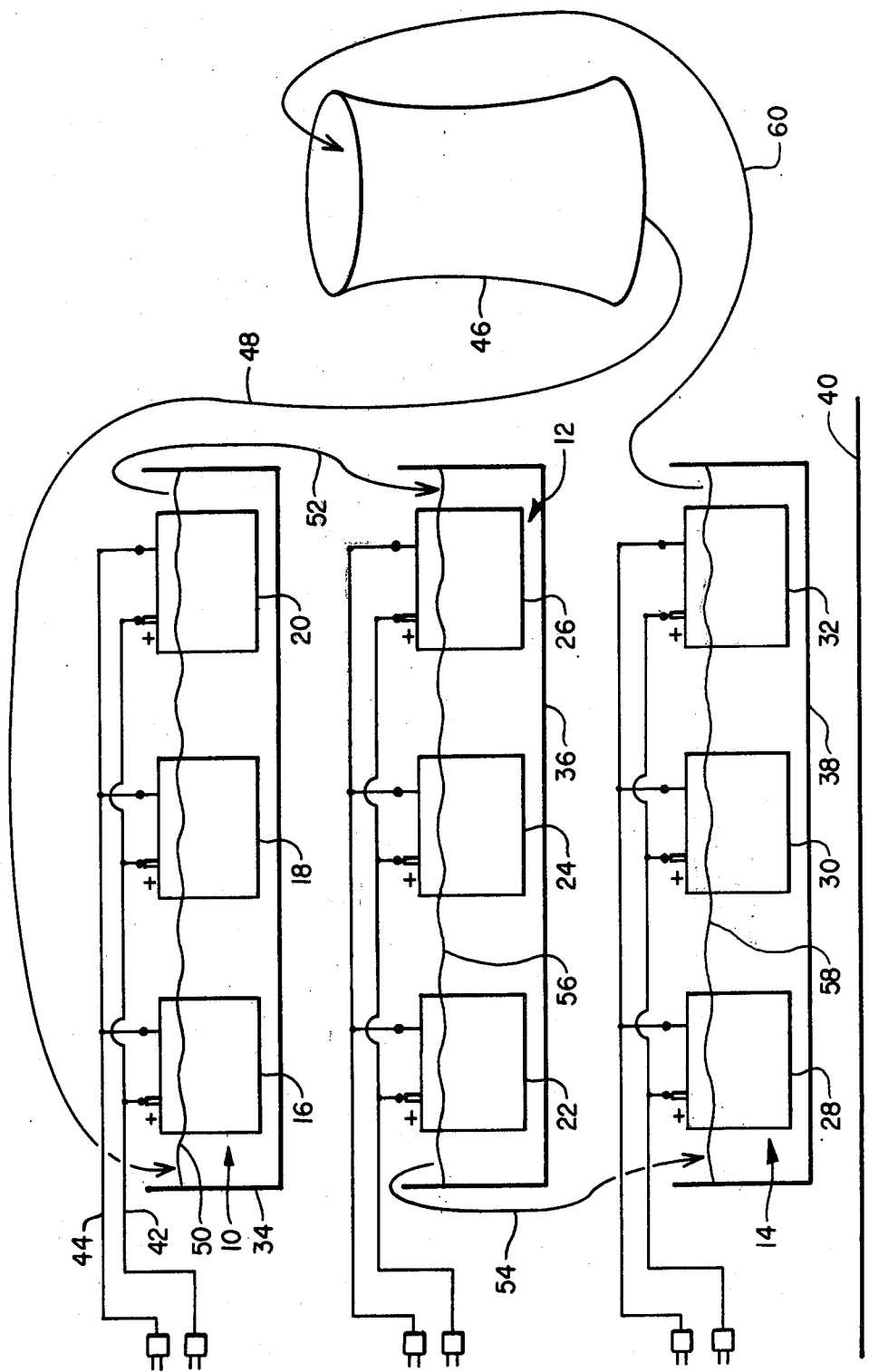
FIG. 1 is a schematic of the preferred embodiment process of our invention.

Although specific forms of the invention have been selected for illustration in the drawings, and the following description is drawn in specific terms for the purpose of describing forms of the invention, this description is not intended to limit the scope of the invention which is defined in the appended claims.

Referring to FIG. 1, the first step in the preferred process of applicant's invention is to separate a plurality of batteries into a plurality of sets such as sets designated generally 10, 12, and 14 in FIG. 1. The set 10 comprises batteries 16, 18, and 20; the set 12 comprises batteries 22, 24, and 26; and the set 14 comprises batteries 28, 30, and 32. In the preferred process, this step is not done radomly but batteries are sorted into sets depending on the stage of formation, that is, batteries at a similar stage of formation are sorted into a single set.

After separating the plurality of batteries into a plurality of sets such as 10, 12, and 14, the next step in applicant's preferred process is to provide a plurality of container means 34, 36, and 38 for holding a plurality of battery sets such as sets 10, 12, and 14 respectively. These sets are placed into their respective container means and electrically connected together for connection with a separate external rectifying circuit. For example, in container No. 34, the battery set 10 has the positive terminals connected together to a single power line 42 while the negative terminals are all connected to the power line 44. The power lines 42 and 44 are readily adaptable to be connected to a rectifier for forming and charging the batteries in the set 10. The remaining sets of batteries shown in FIG. 1 are each individually connected to a separate rectifying source in a similar manner. This allows individual circuit controls for each individual set of batteries in the stack of battery sets. Each of the container means with its accompanying set of batteries is then stacked at a plurality of positions at different heights above a forming room floor. In FIG. 1, container means 34 is shown above container means 36 and container means 36 is shown above container means 38. In the preferred embodiment the container means with the respective sets of batteries are stacked vertically above one another.

In the preferred process of applicant's invention, the next step is to continuously provide a cooling fluid, such as water, to fill the first container means 34 with battery set 10 to a predetermined level 50, container means 34 being positioned at the greatest height above the forming room floor 40. The flow of cooling fluid or water from a source of water such as cooling tower 46 is represented by the curved line and arrow 48. When the water has reached this level 50, it is allowed to overflow container 34 and enter a second lower adjacent container means such as container 36 as schematically represented by the line and arrow 52. After container means 36 fills to predetermined level 56, the water overflows to enter container means 38 (see curved line and arrow 54) whereupon container means 38 fills to predetermined level 58 after which the cooling fluid or water overflows to enter the adjacent lower container means or to flow onto the forming room floor, or, as in FIG. 1, to be conveyed to cooling tower 46 (see line and arrow 60). Cooling tower 46 or other cooling means acts to remove the heat from the water whereupon the cool water is returned to the highest container means 34.

It will be appreciated that as the water passes through the cooling tower 46, a considerable amount of heat is removed and it is desirable that the batteries sorted into the highest container means such as container means 34 be those batteries most in need of cooling. In general, these are unformed, unfilled batteries where electrolyte is about to be added since a considerable amount of heat is generated when electrolyte first comes in contact with the pasted plates of the batteries. This heat is known as the heat of neutralization. It is desirable, therefore, to position the container means having unformed and unfilled batteries in the highest position where the coldest water is introduced. Hence, battery set 10 in container means 34 in the preferred process is a set of unformed, unfilled batteries with electrolyte to be added before the set is connected to the rectifying means.

Figure 2:
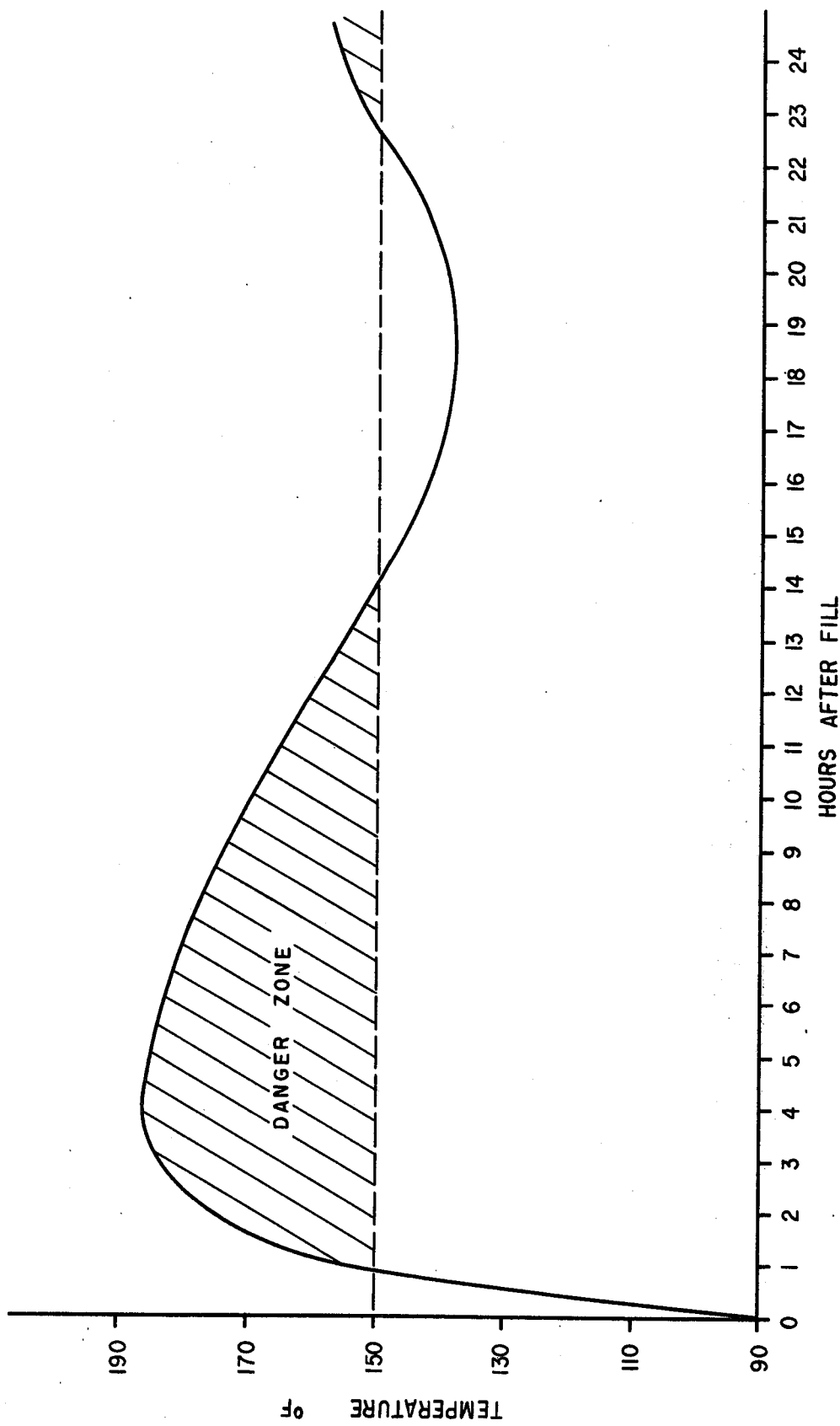
FIG. 2 is a graph showing the temperature of the battery electrolyte during a conventional formation process after introducing electrolyte into the battery.

FIG. 2 is a graph of the temperature of the electrolyte in the batteries as it undergoes a conventional formation process without using the cascading water process of applicant's invention. The ambient room temperature and temperature of the filling acid is 90° Fahrenheit. The abscissa is Temperature in degrees Fahrenheit and the ordinate is Hours after fill, that is, hours after filling the battery with electrolyte. In the initial five hours or so after filling the battery with electrolyte the temperature of the electrolyte exceeds 150° Fahrenheit peaking near 190° Fahrenheit which is potentially harmful to the battery. After the heat of neutralization is past the temperature gradually decreases to below 150° Fahrenheit at 14 hours past filling. Near the end of formation, between 22 and 23 hours after filling, when the back voltage of the batteries is high and the concentration of the acid is approaching 1.265 specific gravity, the temperature of the electrolyte begins to rise again into the danger zone above 150° Fahrenheit.

Figure 3:
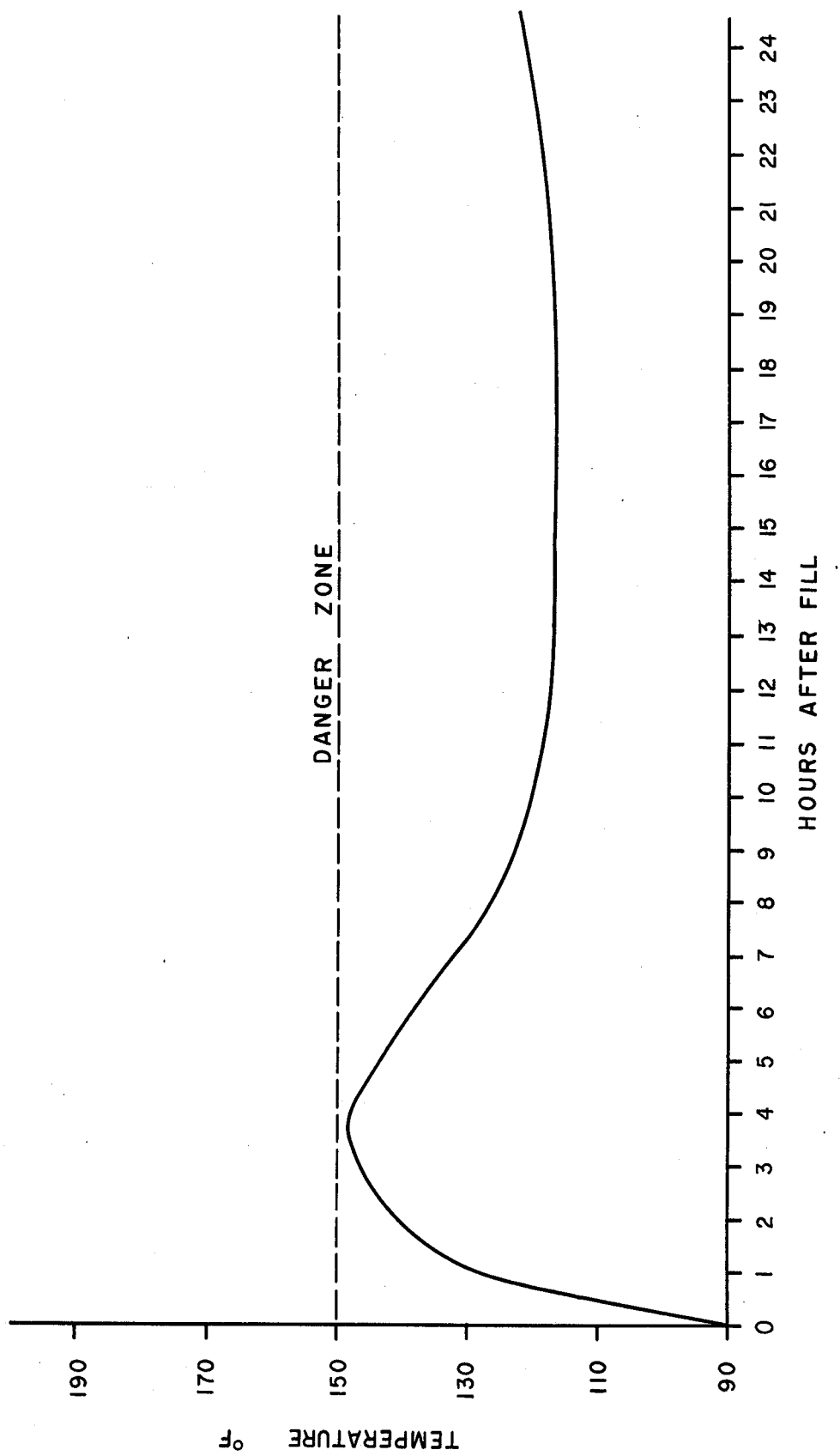
FIG. 3 is a graph showing the temperature of the electrolyte in a battery during the cascade formation process of our invention after filling the battery with electrolyte.

In constrast to FIG. 2, our process results in a temperature curve shown in FIG. 3. The abscissa and ordinate are the same but it will be noted that at no time does the temperature of the electrolyte exceed 150° Fahrenheit, otherwise known as the danger zone. The heat of neutralization is still present and the temperature peaks near 150° Fahrenheit after 4 hours after filling. However, it gradually decreases to between 110° and 130° Fahrenheit for several hours before rising slightly near the end of formation when the back voltage is high.

Figure 4:
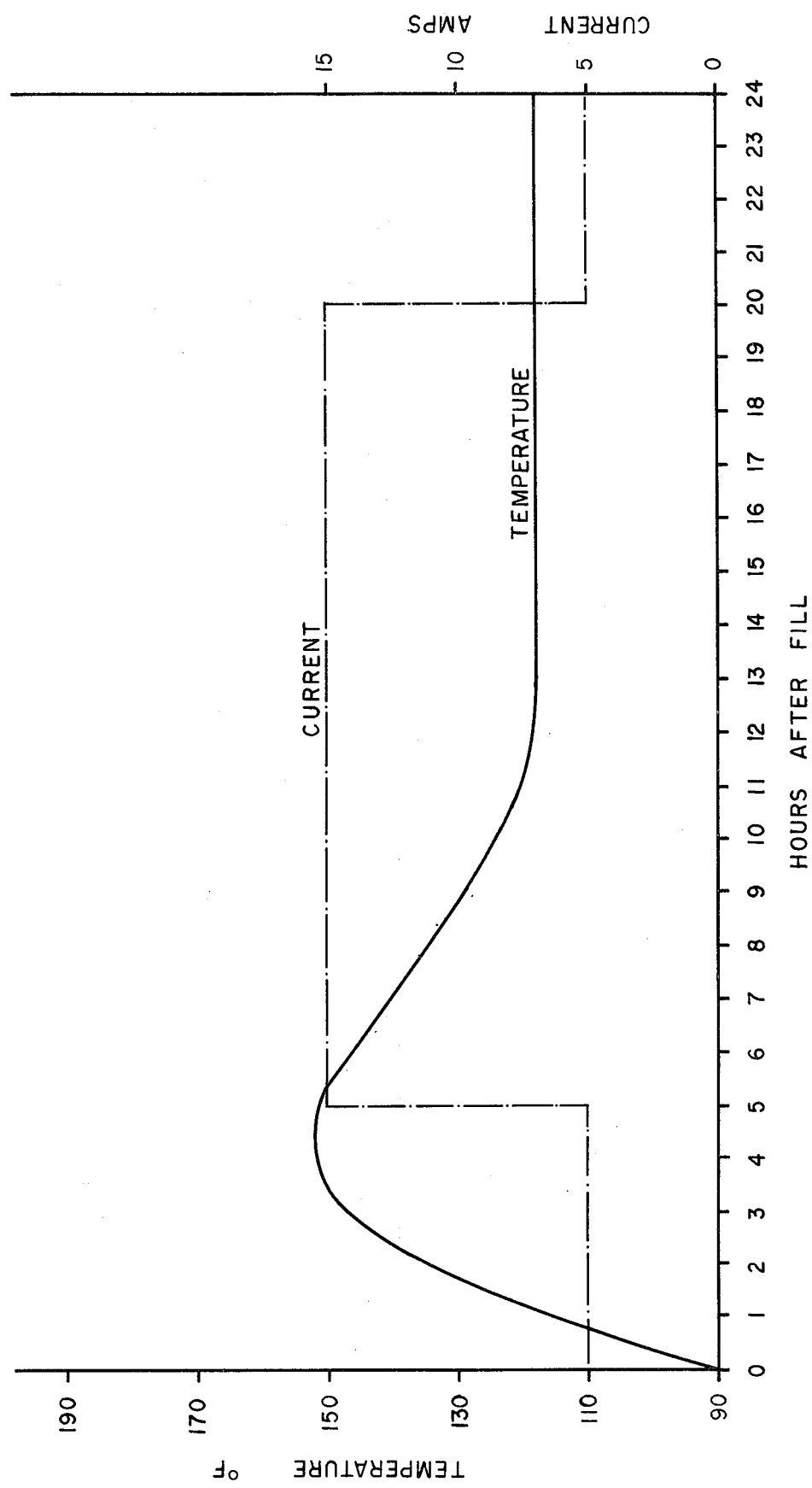
FIG. 4 is a graph of the temperature of the electrolyte in a battery during the preferred embodiment cascade formation of our invention showing the levels of current provided to the batteries by a rectifying circuit superimposed on the graph.

FIG. 4 shows the preferred way of controlling the current while continuing the flow of water during the charging process. It is a graph of temperature of electrolyte versus hours after filling as in FIGS. 2 and 3. The curve is similar to that of FIG. 3 with the current set at a first predetermined level during a first predetermined initial period, for example, 5 Amps for the first 5 hours. Then, after the heat of neutralization has peaked, the current is raised to a second predetermined level for a second predetermined period, for example, 15 Amps for 15 hours. Finally, the current is lowered to a third predetermined level for a third predetermined period for example, 5 Amps for 4 hours. This third adjustment in current to a lower current level helps to reduce the temperature rise in the electrolyte near the end of formation due to the back voltage and increase in specific gravity of the electrolyte. This temperature rise is shown in FIGS. 2 and 3 but not in FIG. 4.

Figure 5:
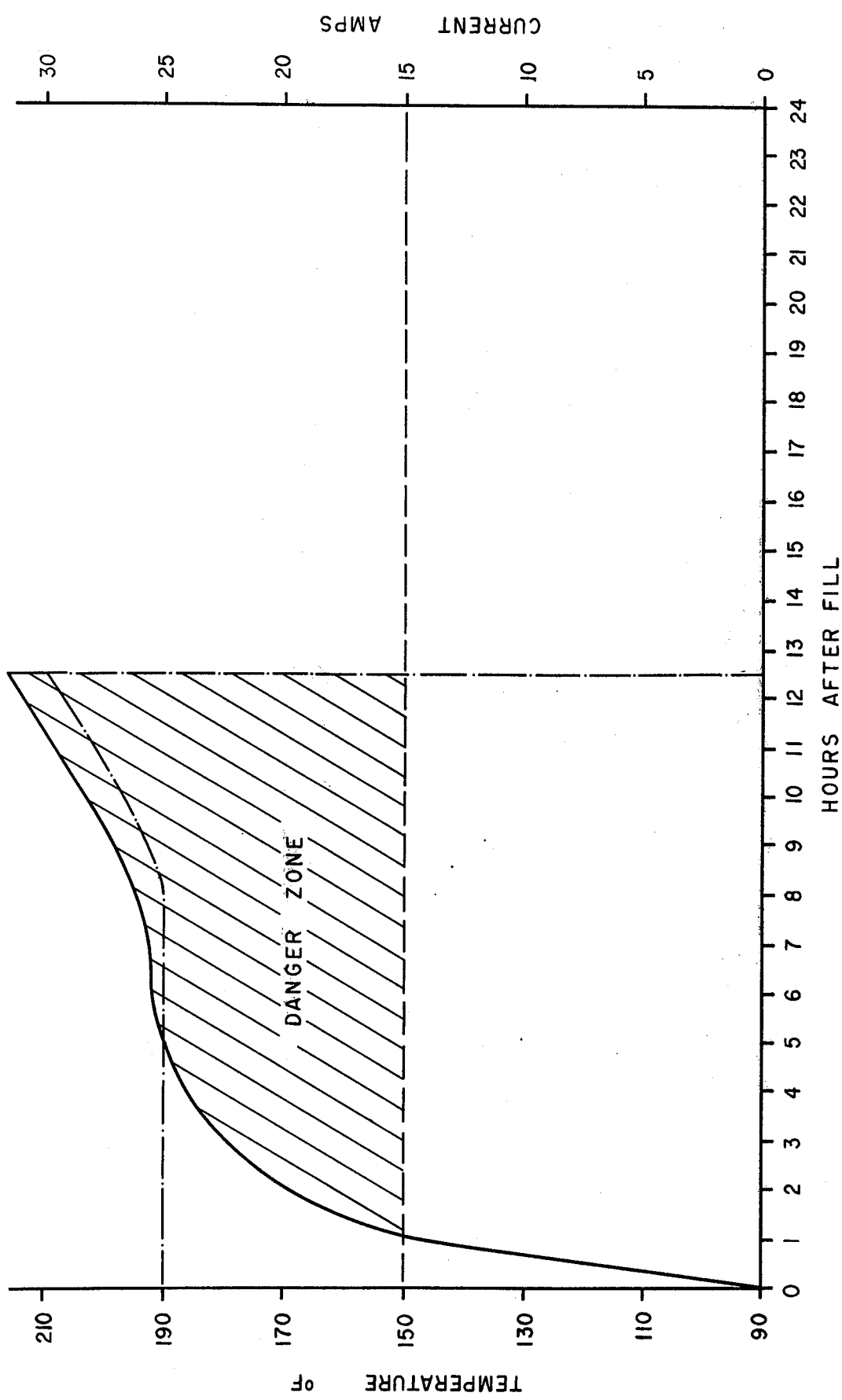
FIG. 5 is a graph showing the temperature of electrolyte in a battery during a conventional formation process in which thermal runaway of the electrolyte has occurred.

FIG. 5 demonstrates thermal runaway in a battery undergoing formation which, sometimes happens when applicant's process is not followed. A charging level current of 15 Amps is set at the beginning of the formation process and the temperature of the electrolyte increases beyond the danger level of 150° due to the heat of neutralization. Because of the accumulation of the heat of neutralization and the heat generated by the high charging level of 15 Amps, the temperature of the electrolyte does not taper off as in FIGS. 2 through 4 to come back below the danger level but continues to rise with probable destruction to the battery.

As was previously indicated, batteries at various stages of formation can be sorted into different sets. Examples of the types of sets that may be desired are unformed and unfilled batteries, batteries which are partially formed but not fully charged and batteries which require a boost charge. The amount of heat which the batteries in these different sets give off will differ. The batteries in the set of unformed and unfilled batteries, when the electrolyte is initally added, will generate the greatest amount of heat and therefore should be placed in a position in the vertical stack of container means which will receive the coolest water or cooling fluid. In FIG. 1 this is container means 34 and battery set 10. As the cooling fluid enters the container means 34, the warmer fluid moves gradually to the top with the cooler fluid remaining at the bottom of the container means. The warmest water then overflows the container means 34 to enter the adjacent lower container means 36. Of the sets above described of batteries, batteries which are partially formed and not fully charged will generate more heat than those batteries which require only a boost charge. Hence, it is desirable to place this set of batteries as set 12 in container means 36. Again the warmest water will gradually move to the top of the tank to overflow and enter the lower adjacent tank 38. Hence, the warmest water will enter the third tank and batteries requiring the least amount of cooling should be placed in this tank. Of the battery sets described above, those requiring boost charge will generate the least amount of heat and they should be placed in the container means 38 as set 14. As described previously, the warmest water will again rise to the top, overflow tank means 38 onto the floor of the forming room or, alternatively, through a purification or neutralization system and then to a cooling tower for return to the vertical array of containing means where it will repeat the cascading process through several container means. The types of sets which might be formed from a plurality of batteries are not limited to the description of the sets given above.

As discussed earlier, each set of batteries is connected to an individual rectifying means and as a particular set of batteries, for example, batteries which have passed the stage of neutralization, requires less amount of cooling, it can be disconnected from the rectifying means, removed from the stack or array of container means or positioned in a different position at a different height in the vertical array while a new set of unformed, unfilled batteries, for example, can be placed in the highest position to receive the maximum amount of cooling. Hence, the features of individual circuit control for each set and the interchangeability of each set with one another at varying heights above the battery forming room floor provide a process for cooling the maximum number of batteries with a minimum amount of forming room floor space.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. A method for producing batteries having plastic cases comprising the steps of:
    (a) separating a plurality of batteries into a plurality of sets;
    (b) providing a plurality of container means for holding a plurality of battery sets;
    (c) placing said sets of batteries into said container means, one set for each container means and electrically interconnecting said batteries in each set for connection to a separate rectifying means for each set;
    (d) stacking said plurality of container means at a plurality of positions at different heights above a forming room floor;
    (e) connecting each set of said batteries to said separate rectifying means for charging said plurality of batteries in each set;
    (f) continuously providing cooling fluid to fill a first container means to a predetermined level, said first container means being positioned at the greatest height above said forming room floor;
    (g) causing said cooling fluid to overflow said first container means and to enter a second adjacent container means located below said first container means; and
    (h) causing said overflow cooling fluid to enter each adjacent lower container means of said plurality.

2. The invention of claim 1 wherein said method further comprises the steps of:

(i) conveying said overflow cooling fluid from a last container means to a heat removing means for removing heat from said cooling fluid; and (j) returning said cooling fluid from said heat removing means to said container means in said highest position.

3. The method of claim 1 wherein step (a) further comprises sorting batteries which are at a similar stage of formation into a single set.

4. The method of claim 3 wherein step (a) further comprises sorting a plurality of unformed, unfilled batteries into a first set; step (c) further comprises placing said first set in said first container means; and said method further comprises the step (k) of filling said unformed, unfilled batteries with electrolyte before step (e).

5. The method of claim 4 wherein said method further comprises the steps of (1) setting said charging current at a predetermined first level during a predetermined initial charging period for said unformed, unfilled batteries whereby heat of neutralization is reduced said step (1) being initiated after step (e); and (m) setting said charging current at a predetermined second level after said initial period, said second level being maintained for a predetermined second period.

6. The invention of claim 5 wherein said method further comprises the step of (n) setting said charging current at a predetermined third level for a predetermined third period after said second period.

7. The invention of claim 6 wherein said first and third predetermined levels are less than said second predetermined level.

8. The invention of claim 6 wherein said predetermined first level is about five Amps and said predetermined initial charging period is about 5 hours; and said predetermined second level is about 15 Amps and said predetermined second period is about 15 hours; and said predetermined third level is about 5 Amps and said predetermined third period is about 4 hours.

9. The invention of claim 5 wherein the temperature of said electrolyte is maintained below a predetermined temperature.

10. The invention of claim 9 wherein said predetermined temperature is 150° Fahrenheit.

11. The invention of claim 4 wherein said method further comprises sorting partially formed but uncharged batteries into a second set in step (a), placing said second set in a second container means in step (c) and stacking said second container means adjacent and below said first container means in step (d); and separating charged batteries requiring a boost charge in a third set in step (a), placing said third set in a third container means in step (c) and stacking said third container means in a position adjacent and below said second container means in step (d).

12. A method for producing batteries having plastic cases comprising the steps of:

(a) providing a plurality of container means for holding a plurality of batteries;

(b) placing a plurality of batteries into each of said container means;

(c) stacking said plurality of container means at a plurality of positions at different heights above a forming room floor;

(d) charging said batteries in said container means;

(e) continuously providing cooling fluid to fill a first container means to a predetermined level, said first container means being positioned at the greatest height above said forming room floor;

(f) causing said cooling fluid to overflow said first container means and to enter a second adjacent container means located below said first container means; and (g) causing said overflow cooling fluid to enter each adjacent lower container means of said plurality.

* * * * *